(12) United States Patent
Shklarsky

(10) Patent No.: US 7,619,554 B2
(45) Date of Patent: Nov. 17, 2009

(54) PASSIVE RADAR UTILIZING SPACE-BORNE DIGITAL ELECTROMAGNETIC ILLUMINATORS

(76) Inventor: Dan Abraham Shklarsky, 9 Dr. Yona Angel St. Ramat Golda, Haifa (IL) 34952

( * ) Notice: Subject to any disclaimer, the term of this patent is extended or adjusted under 35 U.S.C. 154(b) by 134 days.

(21) Appl. No.: 11/919,950

(22) PCT Filed: May 25, 2006

(86) PCT No.: PCT/IL2006/000618
§ 371 (c)(1),
(2), (4) Date: Nov. 6, 2007

(87) PCT Pub. No.: WO2006/129306
PCT Pub. Date: Dec. 7, 2006

(65) Prior Publication Data
US 2008/0165048 A1    Jul. 10, 2008

Related U.S. Application Data

(60) Provisional application No. 60/685,797, filed on Jun. 1, 2005.

(51) Int. Cl.
*G01S 13/90* (2006.01)
(52) U.S. Cl. .................. 342/25 A; 342/25 B; 342/25 F; 342/180; 342/191
(58) Field of Classification Search ............... 342/25 R, 342/25 A–25 F, 179, 180, 190, 191, 195, 342/197
See application file for complete search history.

(56) References Cited

U.S. PATENT DOCUMENTS

| 7,194,139 B1 * | 3/2007 | Sariel et al. ................. 382/250 |
| 2008/0088508 A1 * | 4/2008 | Smith .......................... 342/453 |
| 2008/0165048 A1 * | 7/2008 | Shklarsky ..................... 342/59 |
| 2009/0102705 A1 * | 4/2009 | Obermeyer ............... 342/25 F |

* cited by examiner

*Primary Examiner*—John B Sotomayor

(57) ABSTRACT

In a passive radar system a space-borne transmitter broadcasts wide-band digitally modulated signals over a region and illuminates the region. A receiver antenna is oriented to receive radiation from at least one portion of the region. The portion is an area viewed by the receiver antenna. A reference antenna is oriented toward the transmitter, the reference antenna receives a portion of the wide-band digitally modulated signal. A coherent processing time duration is selected based on: a radar cross-section of a target within the viewed area, a bandwidth of the wide-band digitally modulated signal, and the viewing angle of the receiver antenna. The received signal from the receiver antenna is coherently processed with a reference signal from the reference antenna, over a time interval greater than the coherent processing time duration.

20 Claims, 7 Drawing Sheets

PASSIVE RADAR UTILIZING SPACE-BORNE DIGITAL ELECTROMAGNETIC ILLUMINATORS

TECHNICAL FIELD

The present invention relates generally to radar systems and more specifically to passive radar utilizing space-borne radiators of wide-band electromagnetic radiation as illuminators.

BACKGROUND OF THE INVENTION

Commonly radar systems are active with a dedicated radio transmitter and a dedicated receiver. Passive radar systems do not have dedicated transmitters but use electromagnetic illumination available from external sources. A bistatic radar uses a single spatially separated transmitter and a single receiver. A multistatic configuration includes multiple transmitters and receivers. In passive radar, a signal reflected or scattered from an object is correlated with the signal originating at the transmitter as a reference signal.

Passive radar has several benefits including low costs of operation and maintenance, and an ability to operate covertly and non-intrusively. Hence, passive radar may be deployed in areas where normal radars cannot be deployed. Since a dedicated transmitter is not used, the passive radar system is of lower cost, physically small, and frequency allocation/licensing is not required. Disadvantages of passive radar include a reliance on third-party transmitters, the operator having no control over the availability of the illuminator, and low effective radiated power. Line of sight is required between the transmitter and the target, and between the target and the receiver. Line of site is further required between the receiver and the transmitter or another connection, e.g network connection, is required. Passive radar systems can be ground-based and fixed, or deployed on mobile platforms including submarines, ships and aircraft. Passive radars have been used or considered with transmitter illumination from terrestrial TV broadcasts, FM radio, cellular broadcasts, enemy radar systems and space platforms particularly communications and navigation satellite signals and global positional system satellite signals.

In a paper entitled "Bistatic radar using satellite-borne illuminators of opportunity", Griffiths, H. D. et al. (International Conference: Radar 92) investigated the possibilities of using analog modulated television transmissions for bistatic radar.

Digitally modulated signals, particularly wide-band digitally modulated signals are commonly transmitted by geostationary earth orbit (GEO) satellites for wide-band communications and television broadcasts. A considerable number of satellites transmitting wide-band digitally modulated signals simultaneously illuminate a major part of the Earth's surface.

There is thus a need for, and it would be highly advantageous to have a method of system and method utilizing wide-band digitally modulated signals broadcast from GEO satellites for passive radar and motion detection.

Reference: http://en.wikipedia.org/wiki/Passive_radar

Background Noise of an Antenna

An antenna that looks toward a given background collects radiation according to Planck's blackbody radiation law. At frequencies that are lower then the maximal value of Planck's law, the mean power density $B_f$ is calculated by the Rayleigh-Jones approximation to Planck's law:

$$B_f = \frac{2 * k * T_B}{\lambda^2} \frac{dbm}{sq.\ meter * Hz * str},$$

where:
  k=Boltzman Constant
  $\lambda$=Wavelength
  $T_B$=Averaged Background Temperature For down-looking antennas the radiation source is the terrain surface and for up looking antennas the radiation source is the sky. Integrating $B_f$ over the upper hemisphere results in:

$$B_e = \frac{4 * \pi * k * T_B}{\lambda^2} \frac{dbm}{sq.\ meter * Hz}$$

$B_e$ is known as the "spectral flux density". Note that $B_f$ and $B_e$ are both frequency dependent (non-white). When an antenna with area $S_A$ looks down from distance R, the approximate area that contributes to the noise is:

$$A = \frac{\lambda^2 * R^2}{S_A};$$

Since the spatial angle is $$\omega = \frac{S_A}{R^2}$$

STR.

The total amount of power that is collected by the antenna is:

$$P_A = \frac{B_e * A * \omega * W_S}{4 * \pi} = k * T_B * W_s;$$

where $W_s$ is the band-width.

Note that $P_A$ is frequency independent (it is white!). This fact enables the description of the antenna as a resistor with noise figure of 1 at temperature $T_B$.

In a more rigorous manner the antenna radiometric temperature is derived from the integration over the distribution of the background temperature in the field of view of the antenna. In order to accurately calculate the radiometric temperature, the temperature and the emissivity of the background must be known. 290K is considered the upper bound for Te, the earth background temperature. The precise value of the earth background temperature is a complex function of the type of the terrain, the weather and the direction of the antenna. Sky temperatures are usually lower then 100 K.

Diversity

Multiple pictures of the same object can serve as a tool to improve image quality. A certain object that is imaged more than once will result in certain differences or diversities between the pictures. Such differences are related to the viewing process and/or to the object itself. The sources for differences in the viewing process include: temporal, wavelength, polarization, direction of the source of the illumination of the object, direction and/or angle of viewer, noise and interference content. Typical differences within objects are originated by: location due to some kind of movement; or change in temperature.

Different elements of corresponding diversity images are either identical or different. The well known classification of all the elements of the different images includes: a "sum group" that contains all the elements of all the pictures, or the union between the different pictures. Identical elements i.e. the group of all the elements that exists in all the pictures individually, is known as "intersection group". The third group is the difference group, given by the union group minus the intersection group.

Identical elements of multiple images can be used to improve detection when combined either in coherent or in non coherent manners. Differences between multiple images carry additional information that can improve the final processed image, however proper processing of union, intersection and difference must be performed. Union processing is used to reduce randomness (noise) at the picture it is based on different summation rules for the wanted and the noise elements, another application is the inclusion of missing elements into more complete pictures by various diversities (polarization, wavelength, directions etc.) Difference processing is the most common, on a ground fixed platform, a ground moving platform, a marine fixed platform, a marine moving platform, an airborne platform, or a space-borne platform. Preferably, data based on the received signal is dispatched to a second platform and a function is performed at the second platform, such as further processing and storing. Preferably, multiple space-borne transmitters emit multiple wide-band digitally modulated signals respectively and further processing includes three dimensional imaging and/or diversity imaging. Preferably, the coherent processing further within the viewed area moving target indication, moving target detection, mapping the viewed area, location determination of the target, tracking the target within said viewed area, classifying the target within the viewed area and identifying the target within the viewed area. Preferably, when multiple receiver antennas receive respectively multiple received signals three dimensional image processing and/or diversity image processing is performed based on the received signals According to the present invention there is provided a radar image processed according to the methods as disclosed herein.

According to the present invention there is provided a passive radar system including a space-borne transmitter which broadcasts a wide-band digitally modulated signal over a region and illuminates the region; a receiver antenna oriented to receive radiation from at least one portion of the region. The portion is an area viewed by the receiver antenna, and a reference antenna oriented toward the space-borne transmitter. The reference antenna receives a portion of the wide-band digitally modulated signal. A coherent processing time duration is selected based on: (i) a radar cross-section of a target within the viewed area, (ii) a bandwidth of the wide-band digitally modulated signal, and iii) an antenna viewing angle of the receiver antenna. The antenna viewing angle is equal to a dimension of the receiver antenna divided by a range to the target. The received signal from the receiver antenna is coherently processed with a reference signal from the reference antenna, over a time interval greater than the coherent processing time duration. When the receiver antenna is traveling at a velocity over the region at a range from the target, the selection of coherent processing time duration is further based on said velocity and said range. The bandwidth is preferably greater than three hundred megaHertz or greater than four hundred megaHertz. Preferably, the bandwidth is a full bandwidth emitted by the spaceborne transmitter. Preferably, multiple space-borne transmitters emit multiple wide-band digitally modulated signals respectively and further processing includes three dimensional imaging and/or diversity imaging. Preferably, when multiple receiver antennas receive respectively multiple received signals, three dimensional image processing and/or diversity image processing is performed based on the received signals the differences between two adjacent aerial pictures is the source of the so called stereoscopic depth measurement. Other applications of difference processing is the detection of moving target (MTD) and identification of false targets. Intersection processing is used in order to compensate for various blur situations, a known use is tomography.

The term "wide-band" as used herein referring to a digitally modulated signal refers to an absolute value of bandwidth, (not relative to center frequency) typically greater than 300 MegaHertz (Mhz) A bandwidth of greater than 400 Mhz is used in different embodiments of the present invention. A preferred embodiment uses the entire frequency band, typically a broadband signal of 500 Mhz radiated by a satellite transponder, or multiple wide signals from multiple transponders of one or more satellites.

The term "dimension" as used herein referring to an antenna is typically a length, width or diameter of the antenna.

The term "transmitter" as used herein includes a transponder such as in satellite communications.

SUMMARY OF THE INVENTION

In a passive radar system a space-borne transmitter broadcasts wide-band digitally modulated signals over a region and illuminates the region. A receiver antenna is oriented to receive radiation from at least one portion of the region. The portion is an area viewed by the receiver antenna. A reference antenna is oriented toward the transmitter, the reference antenna receives a portion of the wide-band digitally modulated signal. According to the present invention there is provided a method which includes a selection of a coherent processing time duration based on: a radar cross-section of a target within the viewed area, a bandwidth of the wide-band digitally modulated signal, and the viewing angle of the receiver antenna, wherein the antenna viewing angle is substantially equal to a dimension of the receiver antenna divided by a range to the target. The received signal from the receiver antenna is coherently processed with a reference signal from the reference antenna, over a time interval greater than the coherent processing time duration. When the receiver antenna is traveling at a velocity over the region at a range from the target, the selection is further based on the velocity and the range. The bandwidth is preferably greater than three hundred megaHertz. Preferably, the coherent processing includes Doppler range processing. Preferably, the receive antenna is installed

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
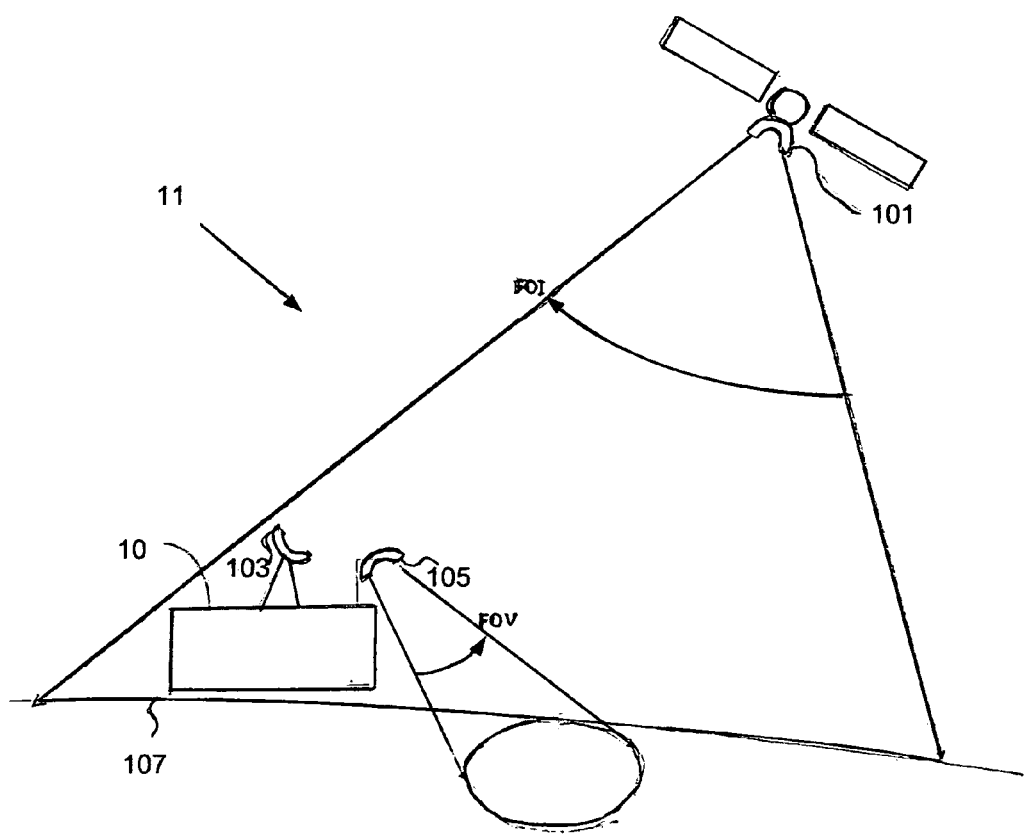
FIG. 1 is a simplified system drawing of a passive radar system, according to an embodiment of the present invention.

The present invention is of a system and method of utilizing previously existing wide-band digitally modulated satellite transmissions for use in passive bistatic and/or multistatic radar systems. The wide-band digitally modulated satellite transmissions originate typically from transmitters on board satellites orbiting in geo-stationary earth orbit (GEO), medium earth orbit (MEO), and/or low earth orbit (LEO).

According to different embodiments of the present invention, targets are detected and/or tracked, two and/or three dimensional images may be mapped and/or targets are classified and/or identified. The present invention in different embodiments is applicable (but not limited) to weather mapping, searching, tracking, search while tracking, target classification and identification. The radar may be incorporated into operations such as: weather monitoring and forecast, mineral vegetation and construction monitoring and various other monitoring (and optionally control) applications on the ground, sea, in air and/or in space. Different embodiments of the present invention are useful in applications such as moving targeting indicator (MTI), moving target detection (LTD), target location and further classification or identification.

The principles and operation of a system and method of utilizing previously existing wide-band digitally modulated satellite transmissions for use in passive bistatic and/or multistatic radar systems, according to the present invention, may be better understood with reference to the drawings and the accompanying description.

It should be noted, that although the discussion herein relates to a terrestrial radar system using illumination from digital wide-band broadcast satellites, the present invention may, by non-limiting example, alternatively be installed, on board of various platforms: (i) terrestrial (ground or marine) fixed platform, (ii) terrestrial moving platform, (iii) airborne platform, and (iv) space-borne platform other then the illuminating satellite.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, a simplified system drawing according to an embodiment 11 of the present invention. Wide-band digital transmissions reach a region of the Earth surface 107 within the field of illumination (FOI) of a space-borne transmitter or radiator 101. A receiving antenna 105 of known spatial location, design and bore-sight direction has a field of view (FOV) subtending a viewed area within the region subtended by the field of illumination (FOI) of transmitter 101. The viewed area is preferably entirely within or equal to the illuminated region. Typically, objects of interest either moving or stationary are within field of view (FOV) on the Earth surface, including terrestrial, i.e. ground and/or marine objects, as well as flying objects, airborne or space-borne objects. Radar receiver antenna 105, according to embodiments of the present invention, receives reflections or scatter of the wide band digitally modulated satellite transmissions by the objects of interest within the FOV. A reference receiver antenna 103 within the field of illumination (FOI) receives the wide-band digitally modulated signals as transmitted directly from satellite transmitter antenna 101. Received signals from both radar receiver antenna 105 and reference receiver antenna 103 are input to radio frequency receivers/processor 10.

Radar systems according to different embodiments of the present invention may be used to generate common radar images in two and particularly three dimensions. A combined system including multiple transmitters in multiple satellites and/or multiple receivers and/or receiving antennas enrich and improve image content and quality by "diversity" i.e. combining of images that are based upon different illuminating signals, signals that differ at least in one major parameter: carrier frequency, polarization, direction of illumination and direction of view.

Table 1 below summarizes different functions available in different embodiments the present invention.

TABLE 1

Examples of radar functions provided by different spatial configurations of radar systems, according to different embodiments of the present invention.

|  | Single Illuminating transmitter 101 | Multiple illuminating transmitters 101 |
| --- | --- | --- |
| Single receiver 105 | Ordinary 2D Radar Images | 2D/3D images illuminated from different directions, blind spot rejection, and multiple shades. |
| Multiple receivers 105 | Temporal differentiation, multiple angles of view, blind spot rejection, 3D-stereoscopic images. | 2D images illuminated from different directions, temporal differentiation, multiple angle of view, blind spot rejection, multiple shading, 3D-stereoscopic images, 3D reflective tomography. |

Figure 2:
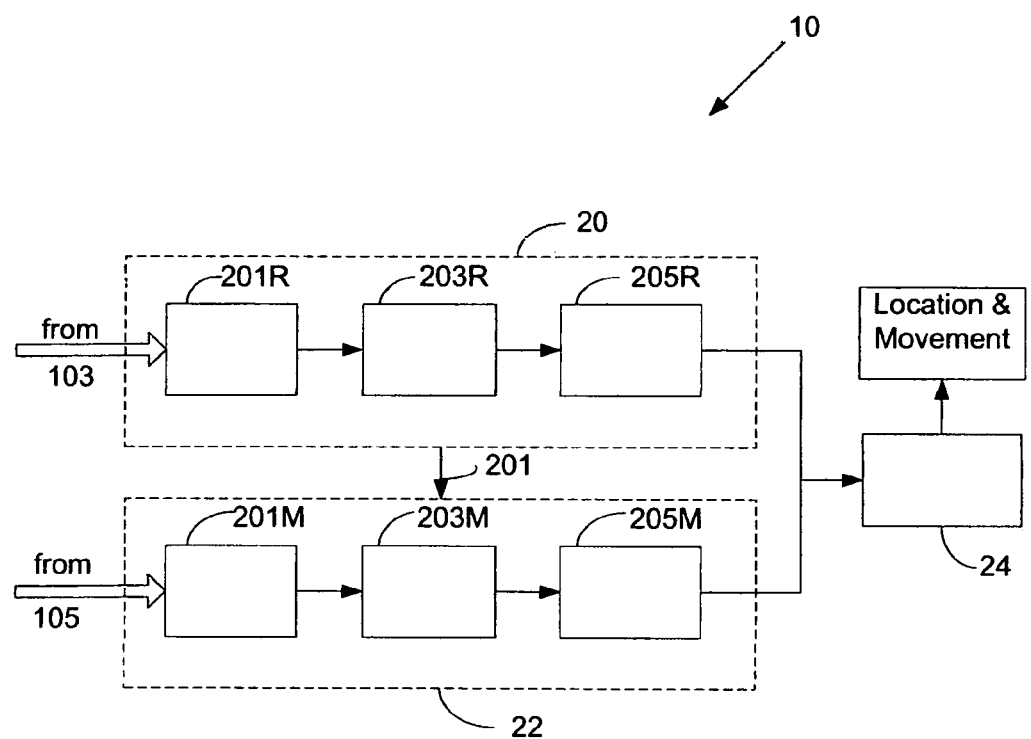
FIG. 2 is a simplified block diagram of receivers/processing unit, according to an embodiment of the present invention.

Reference is now made to FIG. 2, a simplified schematic of radio frequency receivers/processor unit 10, according to embodiment 11 of the present invention. Unit 10 includes a main radio frequency receiver 22 with an input from antenna 105 and a reference receiver 20 with input from reference antenna 103. Both main receiver 22 and reference receiver 20 include a radio frequency front end 201M and 201R respectively typically with multiple amplification stages, frequency mixing and down conversion stages. The outputs of radio frequency front ends 201M and 201R are typically converted to respective digital signals by analog to digital converter A/D 203M and 203R. The data outputs of A/D 203M and 203R are optionally stored locally and/or dispatched to a remote location and optionally stored at the remote location. Typically, clock signals, frequency reference or control signals are transferred typically by appropriate cabling 201 from reference receiver 20 to main receiver 22.

The data outputs of analog A/D 203R of reference receiver 20 and A/D 203M of main receiver 22 are jointly processed coherently by a digital signal processing unit 24. The output of A/D 203M is typically further employed by processing unit 24 for synchronization and filtering. The result of the processing are typically locations of targets within the field of view of antenna 105 or movements of moving targets typically using Doppler processing. Further processing at processing unit 24 (or other subsequent processing units not shown) may include coherent detection, range and angular measurements and other calculations.

Data is transferred to processing unit 24 in real time or after a predetermined time delay. Processing unit 24 may be situated on the same platform as receivers 20 and 22 or alternatively processing unit 24 may be situated remote from receivers 20 and 22 and the data output from receivers 20 and 22 are transmitted to processing unit 24. Typically, processing unit 24 includes buffer storage (not shown) of sufficient capacity to perform processing in real time or after previously determined delay. Measurements of targets' locations and velocities, carried by radar according to embodiments of the present invention, are based on given detailed dynamics (locations and velocities at known times) of the illuminating satellite and the radar platform. Therefore, the dynamics data of the radar platforms and the illuminating satellites are input to processing unit 24 and are synchronized with the received signals. Such data related to illuminating satellite are typically available and are synchronized by reference receiver 20. In cases of fixed radar platforms, data related to the radar platform are typically previously stored in processing unit 24. In moving radar platforms, data are fed to processing unit 24 by a mission control unit (not shown) and/or navigation unit (not shown) attached to the moving platforms.

Power flux density (PFD) at the surface of earth originated by a considerable amount of current satellites is specified by the International telecommunication Union (ITU) regulations. Such power levels are typically low. Anticipated signal to clutter ratios are considerably low and therefore linearity and range of A/D converter 203M are chosen accordingly. Proper detection and clutter rejection procedures are implemented by considerably deep coherent space-time (Range-Doppler) integration. Coherent processing employed depends on the specific features of the space-borne radiator, target, and the relative motion of all participants (satellite, radar units and targets).

Common radar signals are deterministic and pulsed. Wideband digital communication signals as used in the present invention are stochastic and continuous. However, for the wide band digital signals as used in the present invention, ambiguity functions at both axes are sharp, enabling proper separation of targets at the 4-D space-velocity volume. In some embodiments of the present invention, a synthetic aperture radar (SAR) or inverse synthetic aperture radar (ISAR) algorithm may be employed by utilizing accurate values associated with the relative motion of the radar platform and the illuminating satellite.

The illumination field is substantially stationary and independent of the receiving units of the radar and is typically considerably larger, than the viewed field. Therefore FOV can be arbitrarily selected to subtend an area within the region illuminated within the FOI. A considerable number of digital satellites illuminate almost any location on earth simultaneously. Therefore illuminating sources can be selected from many predetermined satellites. Hence a preferred implementation of embodiments of the present invention utilizes two or more independent radiators, and provide three dimensional measurement and detection capability and/or diversity imaging.

In another embodiment of the present invention, a second main receiving channel is used similar to and in addition to the main receiving channel (including antenna 105 and main receiver 22) of embodiment 11. Alternatively, a second main antenna 105 is used and main receiver 22 input is switched between the two main antennas 105. A second receiving channel may be used to view different regions or when both main receive antennas 105 are oriented to the same region and such radar may produce diversity reception or three dimensional images.

Figure 3:
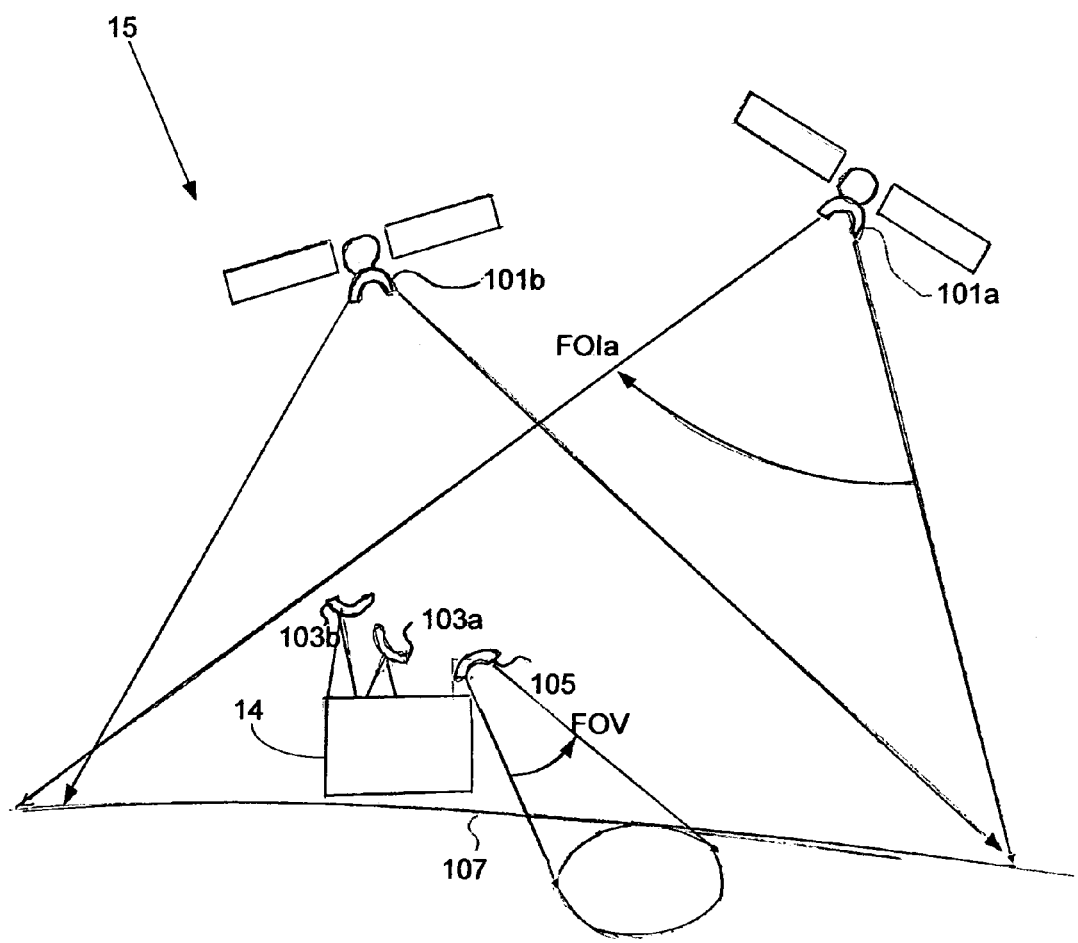
FIG. 3 is a simplified system drawing of a passive radar system using two spatially separate transmitters, according to an embodiment of the present invention.

Reference is made to FIG. 3 which illustrates a preferred embodiment 15 of the present invention, utilizing two illuminating satellites with transmitters 101a and 101b respectively. Embodiment 15 further includes two reference antennas 103a and 103b oriented to receive radiated wide band digital transmissions originating from space-borne transmitters 101a and 101b respectively. Embodiment 15 includes a single main receive antenna 105. In one configuration, signals originating from transmitters 101a and 101b are simultaneously received after reflection by main receive antenna 105 and separated into different main receiver channels 22 such as by frequency demultiplexing. Alternatively, a single main receive channel 22 is used and switched between the two transmitters 101a and 101b. Embodiment 15 in which two transmitters 101 illuminate the same region from different angles is useful to provide transmitter diversity or three dimensional image processing.

Figure 4:
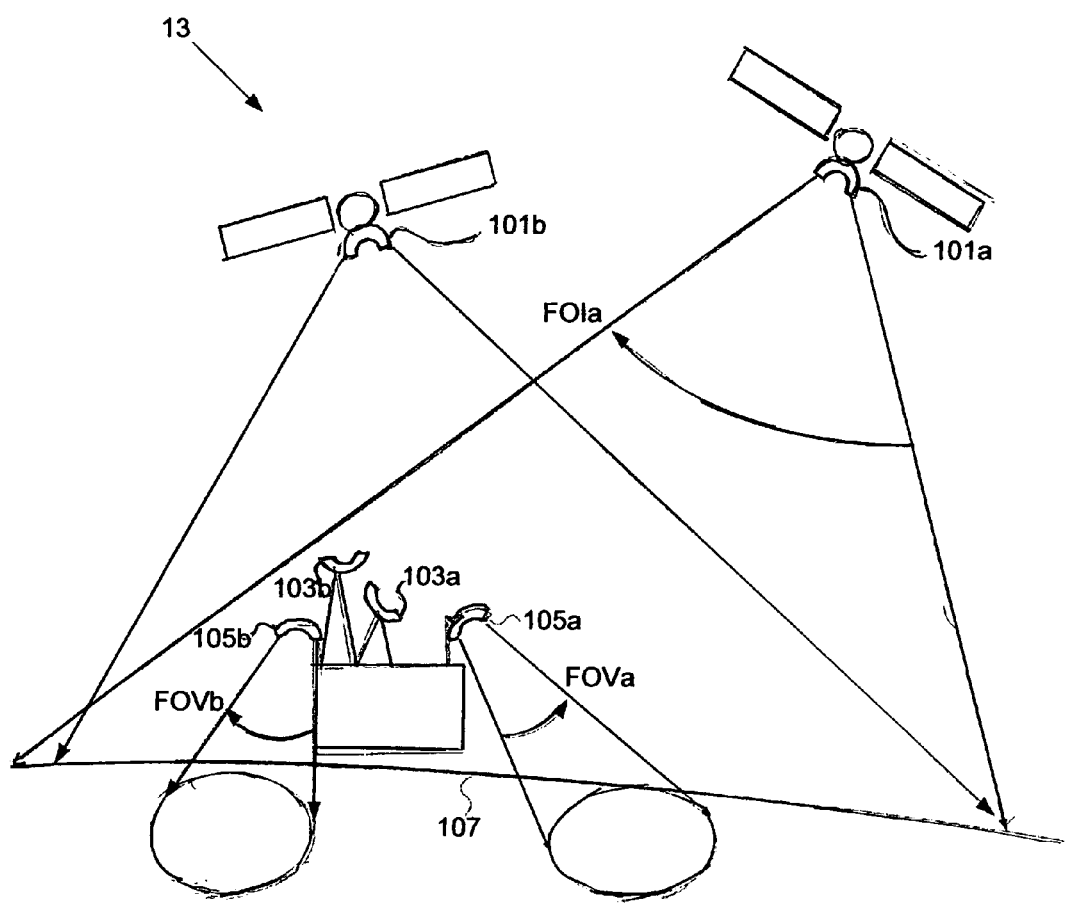
FIG. 4 is a simplified system drawing of a passive radar system with multiple transmitters and receivers, according to an embodiment of the present invention.

Reference is made to FIG. 4 which illustrates a preferred embodiment 13 according to the present invention, similar to embodiment 15 utilizing two different spatially separated transmitters 101 with the addition of a second main receive antenna 105b. First main receive antenna 105a and second main receive antenna 105b may be directed to different regions illuminated by two different satellite transmitters 101a and 101b. Typically, a single radar platform is used including two reference receivers 20 and two main receivers 22. Reference antennas 103a and 103b are oriented respectively toward illuminating satellite 101a and 101b. Typically, two main receivers 22 are used with data input respectively from antennas 105a and 105b.

Alternatively, first main receive antenna 105a and second main receive antenna 105b may be directed to the same viewed area and the combined results may be processed to provided diversity or three-dimensional imaging.

Detection Limits:

The detection limits and the dynamic range of the system, according to embodiments of the present invention are controlled by:

I, the PFD (Power Flux Density) in $$\frac{dbm}{\text{sq. meter} * Hz}$$

is generated by satellite transmitter 101 on the earth surface, I is regulated by ITU rules not to exceed the value of:

$$-158 \frac{dbm}{\text{sq. meter} * Hz}$$

Noise Flux Density (NFD) also in units $$\frac{dbm}{\text{sq. meter} * Hz}$$

is the thermal radiation at the relevant frequency domain that emerges from the earth upward. Since there is no way to reduce NFD, the major noise source of the down looking systems.

The PFD (signal intensity I) and the NFD (Earth Background Be) are given fixed sources of the signal and the noise, respectively, and both have the same physical dimensions that describe spectral flux density on the earth surface. The result is that the limit of the signal to noise is determined on the earth surface.

At C-band with $T_e=300$ K:

$$Be = -140.5 \frac{dbm}{sq \cdot meter * Hz} \quad \frac{Be}{I} = -140.5 - (-158) = 17.5 \text{ dB}$$

At Ku-band and the same temperature $T_e=300$ K:

$$Be = -131.5 \frac{dbm}{sq \cdot meter * Hz} \quad \frac{Be}{I} = -131.5 - (-158) = 26.5 \text{ dB}$$

At both bands the noise flux Be exceeds the satellite originated available power flux I.

Ps, the total amount of signal power that is reflected from a terrestrial target is:

$$Ps = I*\sigma_t*W_0 = I*A_t*\rho_t*W_0. \quad\quad 1.$$

where:

$\sigma_t = A_t*\rho_t$ is the relevant, bi-static, cross section of the target in sq. meters.

$A_t$ is the area of the target.

$\rho_t$ is the reflectivity of the target.

$W_0$ is the bandwidth of the signal in Hz, $W_0$ is a system design parameter that can be selected, according to embodiments of the present invention such that $W_0 \leq W_S$ where $W_S$ is the total bandwidth of the satellite transmitter 101 within a beam.

$P_N$ is the total amount of thermal noise that emerges upward from the whole FOV (Field Of View) of the receiver's antenna.

$$P_N = B_e * A * \epsilon_e * W_0 \quad\quad 2.$$

where:

A is the terrestrial area that is defined by the field of view of the system;

$\epsilon_e$ = is the terrain's emissivity, averaged over A;

The raw signal-to-noise ratio at the input to the receiver is: PS 4.

$$\frac{S}{N} = \frac{2E}{N_0} = \frac{2*(P_s W_0)}{B_e * A * \varepsilon_e} = 2 * \frac{1}{B_e} * \frac{\sigma_t}{A * \varepsilon_e}$$

Since both ratios $$\frac{I}{B}$$

and $$\frac{\sigma_t}{A * \varepsilon_e}$$

are smaller than one, implementation of very long, mainly coherent, processing gain at the receiver is used, according to embodiments of the present invention.

Following the coherent integration (we replace $1W_0$ by $T_i$ the duration of the coherent integration) 5.1 is the output signal to noise ratio:

5.1

$$\frac{S}{N} = \frac{2E}{N_0} = \frac{2*P_s*T_i}{B_e * A * \varepsilon_e}$$

Equation 5.2 below derived by the substitution of Eq. 1 in Eq. 5.1, presents the fact that for a given FOV (i.e. viewed area A) the Time-Bandwidth product of the coherent processing, $W_0*T_i=Q$, is a sole free design parameter.

5.2

$$\frac{S}{N} = 2 * \frac{I}{B_e} * \frac{\sigma_t}{A * \varepsilon_e} * Q_d \quad Q_d = W_0 * T_i$$

In equation 5.2 we substitute $$A \approx \frac{\lambda^2 * R^2}{S_A} \quad S_A = \text{Area of Antenna}$$

to get:

5.3

$$\frac{S}{N} = 2 * \frac{I}{B_e} * \frac{\sigma_t * S_A}{\varepsilon_e * \lambda^2 * R^2} * Q_d$$

Equation 5.4 below is derived from 5.3 by the antenna gain:

$$G_A \approx \frac{4*\pi*S_A}{\lambda^2},$$

5.4

$$\frac{S}{N} = 2 * \frac{I}{B_e} * \frac{\sigma_t * G_A}{\varepsilon_e * 4 * \pi * R^2} * Q_d$$

5.3 and 5.4 demonstrates the $$\frac{1}{R^2}$$

law of the signal to noise ratio.

To get 5.5 we substitute $$B_e = \frac{4*\pi*k*T_B}{\lambda^2}$$

the importance of 5.5 that here $$\frac{S}{N}$$

is free of direct dependence on the carrier frequency, (But note that Q or $\sigma_t$ explicitly depends on the wavelength).

5.5

$$\frac{S}{N} = \frac{I}{2*\pi*k*T} * \frac{\sigma_t S_A}{\varepsilon_e * R^2} * Q_d \quad k = \text{Boltzman's Con.}$$

$$k = 1.38 * 10^{-23} W / K \cdot Hz.$$

We found 5.6 to be best alternative to present the results, $$\frac{S}{N} = \frac{I}{2*\pi*k*T} * \frac{\sigma_t * \theta^2}{\varepsilon_e} * Q_d \quad \theta^2 = \frac{d_1 * d_2}{R^2} = \frac{s_a}{R^2};$$

Figure 5A:
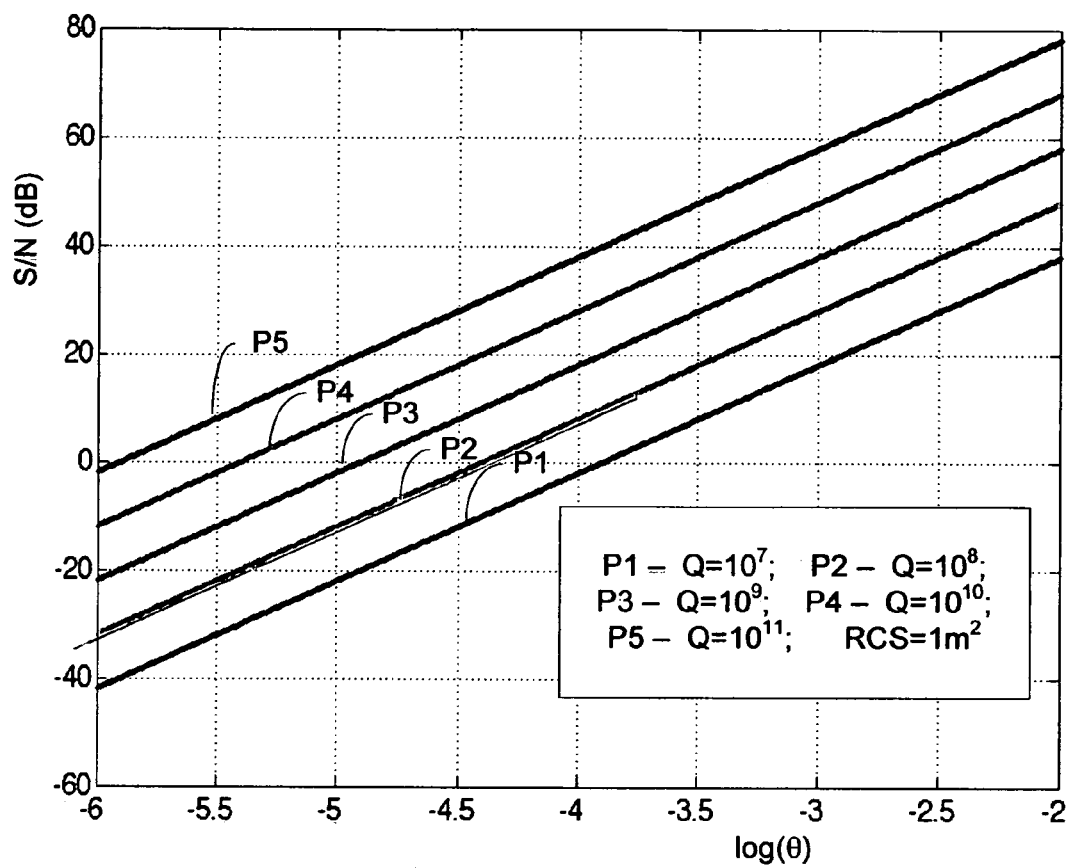
FIG. 5a-c are graphs illustrating signal to noise as a function of the log of the viewing angle for different radar cross sections
Figure 5B:
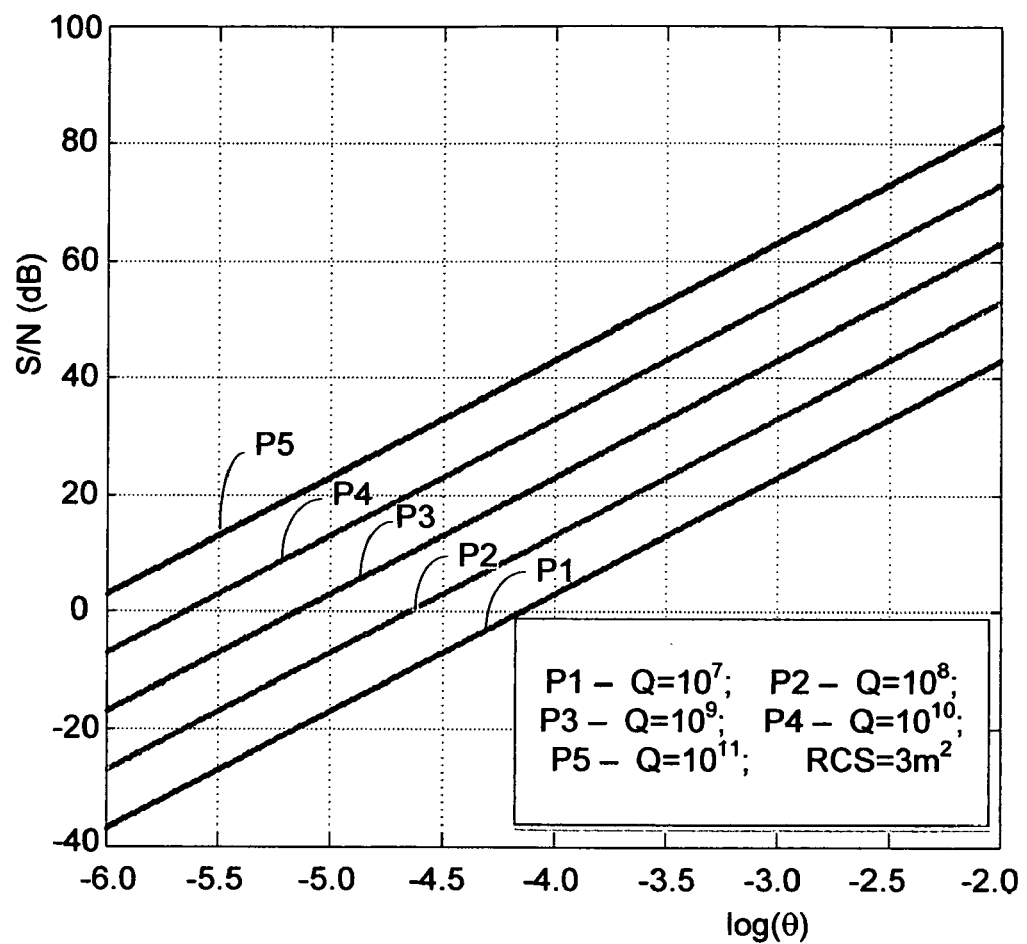
Figure 5C:
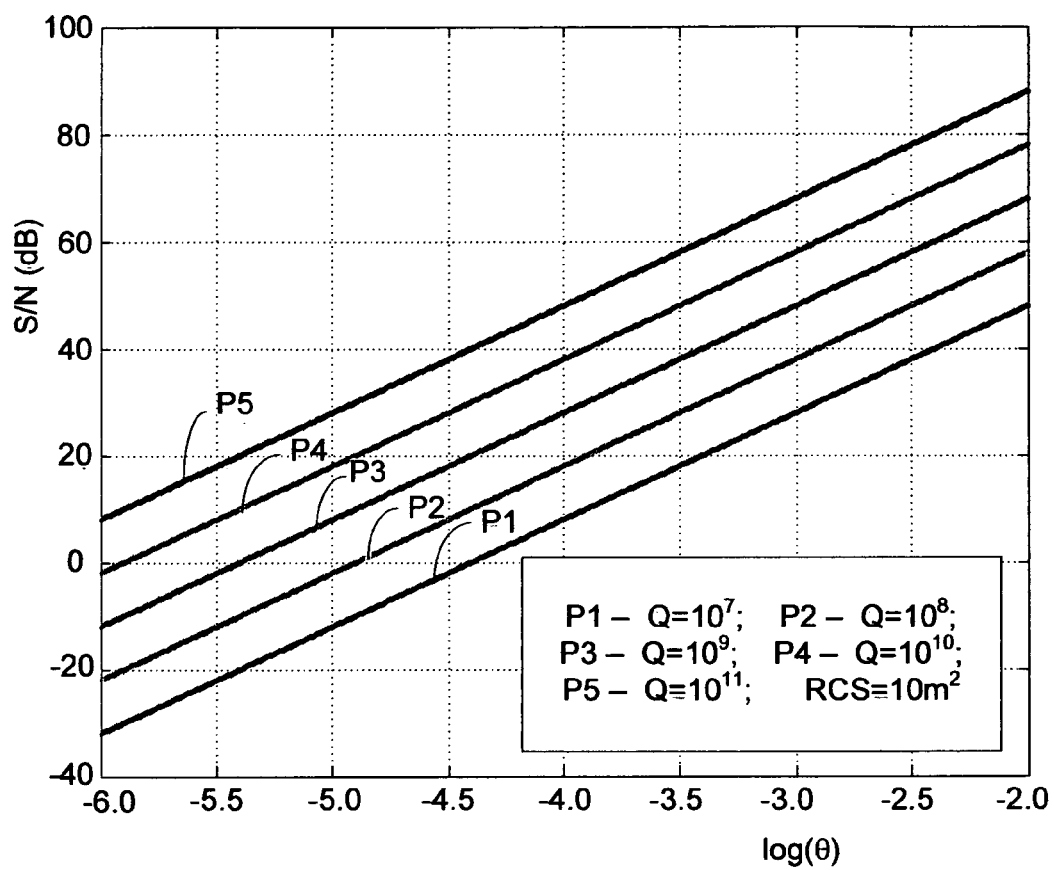

$d_1$ and $d_2$ are the dimensions of a rectangular reception antenna 105 and $s_a$ is its area. FIGS. 5a-5c illustrate graphs of S/N as a function of the log of the viewing angle θ for different values of $\sigma_t$ or radar cross section (RCS) and can be used as a tool to calculate the minimal value of $Q_d$ that is essential to detect a target with given RCS at a wanted S/N ratio as a function of viewing angle θ.

Detection by Down-Looking Synthetic Aperture Radar (SAR)

In a bistatic synthetic aperture radar (SAR) system an ellipsoid of revolution is defined with transmitter 101 of illuminating satellite at one focus of the ellipsoid and co-located receiver antenna 105 and reference antenna 103 at the second focus on a moving platform, according to an embodiment of the present invention. The "normal" and "tangential" directions are defined by the normal and tangential unit vectors of moving ellipsoid of revolution.

Proper detection in simple (strip) SAR processing based upon long coherent integration over $Q_S$ demands $$Q_S > Q_D \text{ or } \frac{Q_S}{Q_D} > 1.$$

Relative pure tangential constant velocity $v_t$ is assumed between the radar and target. The assumption of pure tangential constant velocity is not a feasibility condition, but is implemented only for the purpose of simplifying the calculations. Other embodiments of the present invention need not use this assumption. The transversal resolution of the radar is determined by length of the virtual synthetic antenna $L_v = v_t * T_i$. In order to realize SAR processing, a simple condition must be fulfilled: the target must remain with in the field of view (FOV) of the radar's antenna during the whole period of coherent integration i.e:

$$\frac{\lambda * R}{d_1} \geq L_v;$$

Since the transversal resolution is $$\delta A_z = \frac{\lambda * R}{v_t * T_i}$$

we get $\delta A_z \geq d_1$. The longitudinal resolution is determined by the bandwidth of the system:

$$\delta A_r \approx \frac{c}{W_0};$$

The area of the resolution cell is: $A_c = \delta A_z * \delta A_r$

We get:

$$A_C \approx \frac{\lambda * R * c}{v_t * T_i * W_0} = \frac{\lambda * R * c}{v_t * Q_s};$$

and $$Q_s \approx \frac{\lambda * R * c}{v_t * A_c}$$

These relations are general and are valid for any SAR or Inverse SAR (ISAR) processing. $Q_S$ is the size of the coherent processing that is needed in order to perform the proper synthetic aperture imaging according to the group of parameters: the range, the velocity, the wavelength and the resolution.

The detailed expression of the condition $$\frac{Q_S}{Q_D} > 1$$

is:

$$\frac{v_t * R * (S/N)}{\sigma * (s_a/s_0)} < \frac{\lambda * c * I}{2 * \pi * k * T} = C_I$$

In a simple SAR scan, the viewing or receiving antenna is fixed to its platform and $$A_c = s_0 > \frac{s_a}{4};$$

assuming:

$$\frac{s_a}{s_0} \approx 1$$

we get:

$$\frac{v_t * R * (S/N)}{\sigma} < \frac{\lambda * c * I}{2 * \pi * k * T};$$

Note that for a given system, since the right side of the equations above are fixed numbers, they represent feasibility envelopes At the interior of this envelope our passive SAR system will perform exactly as ordinary active SAR system operating with the same parameters (wavelength, platform velocity, range and resolution).

At the exterior of the envelope the passive system cannot be realized due to lack of power. At more complex SAR systems the above rule is preserved but with two differences: It is possible to dictate virtual velocity $v_v < v_t$. The constraint that locks ratio $s_a/s_0$ does not exist and it can be increased. The introduction of such steps expands the feasibility envelope that locks the major parameters of the system (signal noise ratio, RCS, Range and velocity).

EXAMPLES 2.1 SAR

Cooled T<400 k;

Un-cooled T<600 k;

Assuming $$\frac{s_a}{s_0} \approx 1$$

we get:

$$\frac{v_t * R * (S/N)}{\sigma} < C_1 = \begin{cases} 10^8 \text{(cooled)}; \\ 7*10^7 \text{(un-cooled)}; \end{cases}$$

Detection by Fixed System (Radial Constant Mutual Velocity):

Radial movements are processed by simple Doppler processing. in this case the duration of a target within each range bin must be longer than the duration of the essential coherent integration. The width of a range bin is given by:

$$\delta r \approx \frac{c}{2*W_0}$$

The radial component of the velocity is $v_r$ and the transition time is:

$$T_t = \frac{\delta r}{v_r} = \frac{c}{2*W_0*v_r}$$

Resulting in a condition on maximal velocity:

$$T \le \frac{c}{2*W_0*v_r} = T_t$$

or $$v_r \le \frac{c}{2*Q_D};$$

The coherent processing gain is calculated as before according to:

$$Q_D = \frac{2*\pi*k*T}{I} * \frac{S}{N} * \frac{\varepsilon_e}{\sigma_t * \theta^2};$$

And after some manipulations:

$$\frac{v_r * R^2}{\sigma} < \frac{c*I*s_a*\varepsilon_e}{2*\pi*k*T*SN}$$

2.3. Fixed Ground System (Un-Cooled)

The calculation here is done as follows: $Q_D$ is determined from the ratio c/v, $Q_D$ and the wanted S/N dictates the minimal possible 0 to calculate maximal range $R_{max}$ Antenna of 1 sq.m, S/N=6 db:

Maximal range for:

Pedestrian: RCS=1 sq.m max velocity=3 m/sec we get:

$Q_D$=5*10$^7$ θ=-3.7 and $R_{max}$=5 km.

Small vehicle: RCS=3 sq.m max velocity=30 m/sec we get:

$Q_D$=5*10$^6$ θ=-3.4 and $R_{max}$=2.5 km.

Large vehicle: RCS=10 sq.m max velocity=20 m/sec we get:

$Q_D$=7.5*10$^6$ θ=-3.7 and $R_{max}$=5 km.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. In a passive radar system including at least one space-borne transmitter broadcasting at least one wide-band digitally modulated signal over a region thereby illuminating said region, at least one receiver antenna oriented to receive radiation from at least one portion of said region, wherein said at least one portion is a viewed area viewed by said at least one receiver antenna, and at least one reference antenna oriented toward said at least one space-borne transmitter, wherein said at least one reference antenna receives at least one portion of said at least one wide-band digitally modulated signal, the method comprising the steps of
 (a) selecting a coherent processing time duration based on:
  (i) a radar cross-section of a target within said viewed area
  (ii) a bandwidth of said at least one wide-band digitally modulated signal, and
  (iii) at least one antenna viewing angle of said at least one receiver antenna, wherein said at least one antenna viewing angle is substantially equal to a dimension of said at least one receiver antenna divided by a range to said target; and
 (b) coherently processing at least one received signal from said at least one receiver antenna with at least one reference signal from said at least one reference antenna, over a time interval greater than said coherent processing time duration.

2. The method, according to claim 1, wherein said at least one receiver antenna is traveling at a velocity over the region at a range from the target, and wherein said selecting is further based on said velocity and said range.

3. The method, according to claim 1, wherein said bandwidth is greater than three hundred megaHertz.

4. The method, according to claim 1, wherein said coherent processing includes Doppler range processing.

5. The method, according to claim 1, wherein said at least one receive antenna is installed on a platform selected from a group of platforms consisting of: ground fixed platform, ground moving platform, marine fixed platform, marine moving platform, airborne platform, and space-borne platform.

6. The method, according to claim 5, further comprising the step of:
 (c) dispatching data based on said at least one received signal to a second platform wherein at least one function is performed at said second platform, wherein said at least one function is selected from the group consisting of further processing and storing.

7. The method, according to claim 1, wherein said at least one space-borne transmitter is a plurality of space-borne transmitters, wherein said at least one wide-band digitally modulated signal is a plurality of wide-band digitally modulated signals emitted respectively by said space-borne transmitters, further comprising the step of:
   (c) further processing selected from the group consisting of three dimensional imaging and diversity imaging.

8. The method, according to claim 1, wherein said coherently processing further includes at least one function within said viewed area selected from the group consisting of: moving target indication, moving target detection, mapping said viewed area, location determination of said target, tracking said target within said viewed area, classifying said target within said viewed area and identifying said target within said viewed area.

9. The method, according to claim 1, wherein said at least one received signal is a plurality of received signals and wherein said at least one receiver antenna receives respectively said received signals, further comprising the step of:
   (c) three dimensional image processing based on said received signals.

10. The method, according to claim 1, wherein said at least one received signal is a plurality of received signals and wherein said at least one receiver antenna receives respectively said received signals, further comprising the step of:
    (c) diversity image processing based on said received signals.

11. A radar image processed according to the method of claim 1.

12. A passive radar system comprising:
    (a) at least one space-borne transmitter which broadcasts at least one wide-band digitally modulated signal over a region and illuminates said region;
    (b) at least one receiver antenna oriented to receive radiation from at least one portion of said region, wherein said at least one portion is a viewed area viewed by said at least one receiver antenna;
    (c) and at least one reference antenna oriented toward said at least one space-borne transmitter, wherein said at least one reference antenna receives at least one portion of said at least one wide-band digitally modulated signal, wherein a coherent processing time duration is selected based on:
        (i) a radar cross-section of a target within said viewed area,
        (ii) a bandwidth of said at least one wide-band digitally modulated signal, and
        (iii) at least one antenna viewing angle of said at least one receiver antenna, wherein said at least one antenna viewing angle is substantially equal to a dimension of said at least one receiver antenna divided by a range to said target; and
    wherein said at least one received signal from said at least one receiver antenna is coherently processed with at least one reference signal from said at least one reference antenna, over a time interval greater than said coherent processing time duration.

13. The system, according to claim 12, wherein said at least one receiver antenna is traveling at a velocity over the region at a range from the target, and wherein said selecting is further based on said velocity and said range.

14. The system, according to claim 12, wherein said bandwidth is greater than three hundred megaHertz.

15. The system, according to claim 12, wherein said bandwidth is greater than four hundred megaHertz.

16. The system, according to claim 12, wherein said bandwidth is a full bandwidth emitted by said at least one space-borne transmitter.

17. The system, according to claim 12, wherein said at least one space-borne transmitter is a plurality of space-borne transmitters, wherein said at least one wide-band digitally modulated signal is a plurality of wide-band digitally modulated signals emitted respectively by said space-borne transmitters, further comprising:
    (d) a mechanism for diversity image processing based on said wide-band digitally modulated signals.

18. The system, according to claim 12, wherein said at least one space-borne transmitter is a plurality of space-borne transmitters, wherein said at least one wide-band digitally modulated signal is a plurality of wide-band digitally modulated signals emitted respectively by said space-borne transmitters, further comprising:
    (d) a mechanism for three dimensional image processing based on said wide-band digitally modulated signals.

19. The system, according to claim 12, wherein said at least one received signal is a plurality of received signals and wherein said at least one receiver antenna is a plurality of receiver antennas which respectively receive said received signals, further comprising the step of:
    (d) a mechanism for three dimensional image processing based on said received signals.

20. The system, according to claim 12, wherein said at least one received signal is a plurality of received signals and wherein said at least one receiver antenna is a plurality of receiver antennas which respectively receive said received signals, further comprising the step of:
    (d) a mechanism for diversity image processing based on said received signals.

* * * * *